(12) United States Patent  
Olin et al.

(10) Patent No.: US 8,229,813 B2
(45) Date of Patent: Jul. 24, 2012

(54) ACCESS POINT FOR MOBILE DEVICES IN A PACKET BASED NETWORK AND A METHOD AND A SYSTEM FOR BILLING IN SUCH A NETWORK

(75) Inventors: Håkan Olin, Göteborg (SE); Fredrik Althoff, Mölnlycke (SE); Roger Hendelberg, Hisings-Backa (SE); Niclas Carlsson, Jönköping (SE)

(73) Assignee: Landala NAT, Gothenburg (SE)

( * ) Notice: Subject to any disclaimer, the term of this patent is extended or adjusted under 35 U.S.C. 154(b) by 160 days.

(21) Appl. No.: 12/805,529

(22) Filed: Aug. 4, 2010

(65) Prior Publication Data

US 2011/0010282 A1 Jan. 13, 2011

Related U.S. Application Data

(62) Division of application No. 10/363,942, filed as application No. PCT/SE00/02676 on Dec. 27, 2000, now Pat. No. 7,801,781.

(30) Foreign Application Priority Data

Sep. 26, 2000 (SE) ........................ 0003440

(51) Int. Cl.
*G07F 19/00* (2006.01)
*H04M 15/00* (2006.01)
(52) U.S. Cl. .......... 705/34; 709/249; 709/238; 709/223; 709/246; 370/312; 370/338; 370/331; 370/238; 455/405; 455/419
(58) Field of Classification Search .......... 370/338, 370/349, 238, 409, 331, 225, 229, 328, 352, 370/392, 312; 455/419, 405; 709/249, 238, 709/223, 246
See application file for complete search history.

(56) References Cited

U.S. PATENT DOCUMENTS 5,490,139 A * 2/1996 Baker et al. ................ 370/312
5,737,328 A * 4/1998 Norman et al. ............. 370/331
(Continued)

FOREIGN PATENT DOCUMENTS

EP 0597640 5/1994
(Continued)

OTHER PUBLICATIONS

Mark Gibbs. (Jul. 1999). The inner workings of traceroute. Network World, 16(28), 42. Retrieved Mar. 7, 2012, from ABI/INFORM Global. (Document ID: 43107234).*

(Continued)

*Primary Examiner* — Matthew Gart
*Assistant Examiner* — Olusegun Goyea
(74) *Attorney, Agent, or Firm* — Harness, Dickey & Pierce, P.L.C.

(57) ABSTRACT

An access point for mobile devices with wireless communication capability for usage in a packet based network, said network comprising at least one gateway having access to a remote service, the access point comprises communication means for establishing communication with at least one or more access point in order to form a network between at least said access points. Also, there are means for adding the identity of the mobile device; and registering means for registering the identity of data packets transferred through said access point. The invention also concerns a method and system for billing in such a network.

14 Claims, 5 Drawing Sheets

U.S. PATENT DOCUMENTS

| | | | |
|---|---|---|---|
| 5,745,884 A | 4/1998 | Carnegie et al. | |
| 5,870,557 A * | 2/1999 | Bellovin et al. | 709/224 |
| 5,875,179 A * | 2/1999 | Tikalsky | 370/315 |
| 6,049,533 A * | 4/2000 | Norman et al. | 370/328 |
| 6,070,070 A * | 5/2000 | Ladue | 455/419 |
| 6,240,402 B1 * | 5/2001 | Lynch-Aird | 705/400 |
| 6,498,795 B1 * | 12/2002 | Zhang et al. | 370/400 |
| 6,501,741 B1 | 12/2002 | Mikkonen et al. | |
| 6,584,500 B1 * | 6/2003 | Arkko | 709/223 |
| 6,601,099 B1 * | 7/2003 | Corneliussen | 709/224 |
| 6,608,832 B2 * | 8/2003 | Forslow | 370/353 |
| 6,665,718 B1 | 12/2003 | Chuah et al. | |
| 6,681,252 B1 * | 1/2004 | Schuster et al. | 709/227 |
| 6,771,604 B1 | 8/2004 | Dommety et al. | |
| 6,775,258 B1 * | 8/2004 | van Valkenburg et al. | 370/338 |
| 6,788,651 B1 * | 9/2004 | Brent et al. | 370/255 |
| 6,944,150 B1 * | 9/2005 | McConnell et al. | 370/352 |
| 6,973,057 B1 | 12/2005 | Forslow | |
| 6,987,735 B2 * | 1/2006 | Basso et al. | 370/238 |
| 7,174,564 B1 | 2/2007 | Weatherspoon et al. | |
| 7,234,002 B2 * | 6/2007 | Lewis | 709/246 |
| 7,466,703 B1 * | 12/2008 | Arunachalam et al. | 370/392 |
| 7,869,786 B1 * | 1/2011 | Blewett et al. | 455/405 |
| 8,086,217 B1 * | 12/2011 | Blewett et al. | 455/405 |
| 2004/0034714 A1 * | 2/2004 | Garakani et al. | 709/238 |
| 2005/0157691 A1 * | 7/2005 | Stewart et al. | 370/338 |
| 2005/0232222 A1 * | 10/2005 | McConnell et al. | 370/349 |
| 2009/0067399 A1 * | 3/2009 | McConnell et al. | 370/338 |
| 2010/0202428 A1 * | 8/2010 | Thompson et al. | 370/338 |

FOREIGN PATENT DOCUMENTS

| | | |
|---|---|---|
| EP | 1011278 | 6/2000 |
| EP | 1017197 | 7/2000 |
| JP | 09-214412 | 8/1997 |
| JP | 11-177582 | 7/1999 |
| JP | 11-239154 | 8/1999 |
| JP | 11-284666 | 10/1999 |
| JP | 2000-069050 | 3/2000 |
| JP | 2000-078147 | 3/2000 |
| JP | 2000-232476 | 8/2000 |
| JP | 2002-077462 | 3/2002 |
| WO | WO 9859295 A1 * | 12/1998 |
| WO | WO 9900946 A2 * | 1/1999 |
| WO | 9951055 | 10/1999 |
| WO | WO 2005064973 A1 * | 7/2005 |
| WO | WO 2006018045 A1 * | 2/2006 |
| WO | WO 2007071275 A1 * | 6/2007 |
| WO | WO 2007088174 A1 * | 8/2007 |

OTHER PUBLICATIONS

James R Borck. (May 1998). VisualRoute continues to improve on route tracing. InfoWorld, 20(18), 83. Retrieved Mar. 7, 2012, from ABI/INFORM Global. (Document ID: 29203091).*

English translation of Office Action mailed Nov. 2, 2010 for corresponding Japanese Patent Application No. 2002-531689.

* cited by examiner

ACCESS POINT FOR MOBILE DEVICES IN A PACKET BASED NETWORK AND A METHOD AND A SYSTEM FOR BILLING IN SUCH A NETWORK

This application is a Divisional of U.S. patent application Ser. No. 10/363,942 filed Jul. 10, 2003 now U.S. Pat. No. 7,801,781, which claims priority from PCT/SE00/02676 filed on Dec. 27, 2000, which claims priority from Swedish Application No. 0003440-5 filed on Sep. 26, 2000, the entire contents of each of which are incorporated herein by reference.

FIELD OF INVENTION

The present invention generally relates to data communication and billing in a packet based network and particularly to an access point for mobile devices in such a network and a method and a system for billing in such a network.

BACKGROUND OF THE INVENTION

The usage of mobile devices such as portable computers, personal digital assistants (PDAs), etc, has during the past years increased drastically. Since the breakthrough of the Internet, more and more users are interested in connecting to other devices, networks and services, for instance corporate networks or the Internet, through their mobile devices. The primary option has often been to use a dial-up connection via a traditional modem connected to a public telephone network. Then, when using the mobile device on the road, a modem in a cellular phone has been used. However, a modem used in a circuit-switched telephone network suffers from quite a long time for establishing a connection and billing has to be based on the time connected. In addition, such dial-up connections using a cellular phone suffers from low data transfer rates.

However, with the introduction of packet based mobile telephone networks such as GPRS ad UMTS, it will be possible to introduce billing based on the amount of data transferred. Such systems also offer higher bandwidth, but requires extensive investments in infrastructure. Even though the bandwidth will increase it will not be in the vicinity of a wired network. In addition, due to the heavy investments required, costs for connection will initially be quite high.

A solution for the problem of connecting mobile devices at a moderate cost and charging for that service has been proposed in the U.S. Pat. No. 5,745,884 "System and method for billing data grade network use on a per connection basis". The system in U.S. Pat. No. 5,745,884 uses a concept, where users of mobile devices connect to an access point located in a strategically chosen area, such as a hotel lobby, an airport, etc. The access point acts as a publicly accessible wireless LAN. Then, the communication is forwarded by the access point via a tunneled connection to the service of interest. The tunneled connection could be any type of WAN. Thus, the access point acts as a gateway between the wireless LAN and the WAN. Then, the tunneling protocol enables collection of information about which user it was who used the connection. This information serves as a base for later billing, and the billing is on a per connection basis.

However, the solution in U.S. Pat. No. 5,745,884 is based on a fixed structure, where it is required that the access point has a connection to the service which the user wants to connect to. The solution also lacks possibilities for the operator of said access point to control the data traffic over the access point. Also, such a solution is only useful for usage in restricted areas and expansion of such a network is not feasible. In addition billing is restricted to the parties on the ends of the data tunnel.

OBJECT OF THE INVENTION

It is therefore an object of the present invention to provide an improved form of connection for mobile devices and a method and system for billing for such a service, in order to at least partly overcome the above mentioned problems.

The object is achieved by an access point and a method and a system for billing according to the appended claims.

SUMMARY OF THE INVENTION

According to the invention an access point for usage in a packet based network, comprising: means for communicating with at least one gateway having access to a remote service; first communication means for wireless communication with mobile devices; second communication means for establishing communication with at least one more access point in order to form a network between at least said access points; registering means for registering the identity of a mobile device originally sending a data packet for all data packets transferred through said access point either directly from a mobile device or indirectly through another access point from a mobile device.

Hereby, an access point is provided which overcomes the above mentioned problems. Such an access point provides the possibility for different service providers to utilize each other's infrastructure. Since the access point has the capability to connect to other access points in order to form a private network, it is not necessary that every access point has a direct connection to the remote service. Thus, the access point acts as a router routing data packets from a mobile device or another access point directly to a gateway or indirectly to a gateway through other access points of the access point network.

Also, it becomes possible to communicate within the private network, i.e. a first mobile device connected to a first access point can communicate with a second mobile device connected to a second access point. Thus, it becomes possible for any individual or company to set up such an access point, and then on one hand provide accessibility to users of mobile devices and on the other hand get paid for this service, independent on the operator of a specific user, since the origin of every transferred data packet is traceable and each access point has means for registering this.

In accordance with the invention, it is possible to introduce a new access point in a system having other access points, and then use the other access points' capabilities to connect to the gateway. Thus, an access point does not necessarily have to have direct access to the gateway in order to be able to set up communication between the mobile communication device and the gateway. This is provided through the second communication means, which preferably provides wireless communication, for instance using a wireless LAN such as a wireless LAN according to the IEEE 802.11b standard. In one embodiment the communication with other access points is separated from the communication with the mobile devices. However, in another embodiment the communication with other access points and the mobile devices is provided by a single communication means, i.e. the mobile devices and the access points communicate in the same network.

Then, in order to be able to transfer and distribute costs among the operators of separate access points, each access point has registering means for registering which packet for which user that was sent. Preferably, this information is then collected and analyzed in a central node. The registered labels are preferably stored on a storage media to be sent in a batch later on.

In the network where the invention is applicable, there is a gateway, which could be a traditional gateway, providing access to a remote service. The remote service could be a public network, such as the Internet, a corporate network, a private server, etc. The gateway constitutes the interface between the internal network between the access points and the outside.

The identity of the mobile device could be added in the mobile devices and could in one embodiment simply consist of the information in the header of the data packet. The identity of a user could then be the network address of the mobile device, in a network using the Internet Protocol (IP), the identity of a mobile device could then be the IP address of the mobile device.

In another embodiment the access point further comprises labeling means for adding a label to a data packet transferred from a mobile device directly to said access point, said label comprising the identity of said mobile device. Then, the user of the mobile device is known to the access point, and is preferably authenticated. When the known user sends a data packet from its mobile device, the access point adds additional information to the packet, i.e. a label, which makes the packet traceable. The label provides a secure way of determining which user that sends which packets.

Preferably, the access point comprises authentication means for authenticating the identity of a mobile device connected to said access point. Such means for authentication provides authentication which is needed for a proper and secure billing. The means preferably interact with a central node being in contact with the access point. The identity of a mobile device could as above mentioned for example be the IP address of the device. In this case, when the mobile device obtains its network address from a central node responsible for handling network addresses, information about which user that obtained that network address is stored for later use. When obtaining a network address, some sort of password authentication is appropriate, for example using a scrambling device holding a secret key only known to the mobile device and the central node.

In another embodiment the identity of the mobile device could be exchangeable by the user of the device in order to let more than one user utilize the device. In the case of an exchangeable identity, the identity could be stored in a certificate or could comprise some sort of a private key known by the user and a service provider.

Preferably, the access point has means for establishing a communication route to said gateway. The routing paths can then be determined on predetermined criteria based on traffic cost, performance, capacity and which operator the user of the mobile device uses. This information is then preferably described in the label applied to the data packet. Then, other nodes, i.e. access points utilize this information before the data packet leaves the private network through the gateway. Preferably, which gateway that is used is also dependent on this additional information.

The network formed by the access points could be quite complex, especially when introducing several gateways. Most likely these access points, gateways, and infrastructure in between is operated by different service providers. Also, the performance of the components could differ. For example, one access point might have a direct T1 connection to a gateway, while another access point only has an ISDN connection. Then, in such a network, the access point according to the present invention preferably further comprises: means for establishing a plurality of communication routes to a remote service; means for evaluating said communication routes according to predetermined criteria; and means for selecting an optimal route according to said predetermined criteria. Hereby, it becomes possible to take criteria, such as performance or cost, which service provider is operating a specific gateway, etc into account when determining, at the access point where the mobile device is connected, the route of a data packet. In addition the optimal route could be dependent on the identity of the mobile device. In the case where the end user is charged by a service provider, and the service provider in their turn compensates the owners of the nodes along the communication route from the mobile device to the gateway, it could be useful to direct the communication to gateways and infrastructure owned by the end user's service provider in order to minimize compensation to competitors.

In order to support mobility when a user moves out of range from an access point, the access point preferably has hand-over means for evaluating the signal strength of the communication with said connected device for hand-over to or from another access point. In another embodiment, the hand-over means are implemented in the mobile device.

Also, according to the invention an access point for usage in a packet based network, comprising: means for communicating with at least one gateway having access to a remote service; first communication means for wireless communication with mobile devices; and second communication means for establishing wireless communication with at least one more access point in order to form a network between at least said access points; wherein said network of said second communication is separated from the network between said first communication means and said mobile devices.

Hereby an access point is provided which provides the possibility to build an ad-hoc network of access points while at the same time providing users connecting to the access point a connection to a remote service either directly to a gateway or indirectly through said ad-hoc network of access points. The access point operates as a router which routes packets from network between the mobile device connected directly or indirectly to the access point to another network, which could be either indirectly via the ad-hoc network or directly to a gateway.

Also, according to the invention, a method for billing in a multi-operator network comprising a plurality of access points forming a private network, and at least one gateway having access to a remote service, comprising the steps of: tracing the route of a data packet based on information contained in said data packet registered along the route of said packet, said information comprising the identity of a mobile device originally sending said data packet; and creating a billing record separated on nodes involved in said traced route.

Hereby, a billing method is provided which provides the possibility for billing in such a network which is possible to create using the access point according to the invention overcoming the above-mentioned problems. Preferably the identity of a mobile device connecting to an access point is authenticated before adding the identity in order to ensure that the correct user is billed. Also, in order to compensate all the operators involved in transferring a user's data packets, the method preferably distributes the billing record on nodes involved in the traced route. With "node" is meant any access point or gateway involved in transferring the data packet. In one embodiment the label could consist of the header that is added in the mobile device, and the identity of the mobile user could then be the network address in the packet header. In another embodiment, a label could be added in the access point on top of the data packet header added in the mobile device. Then, the label could comprise even more information, for example information about the data contents. Also, when adding information in the access point, another identification object than the network address of the mobile device could be used. The tracing comprises in a preferred embodiment of the steps of: registering labels of all data packets transferred through said access point either directly or indirectly through another access point from a mobile device; and sending from each access point information to a central node about said labels.

Preferably, the step of creating a billing record is executed in a central node in said network. Such a central node could be a server operating either within the network of the access points or on the Internet. In the case where the central node is accessible on the Internet, the communication from the access points have to go through any of the gateways. Since the billing information is sensitive data, the connection between an access point and the central node is preferably tunneled, i.e. encapsulated in one end and then decapsulated at the other end. The central node could then provide many of the administrative tasks in the network, for example initiating the sending of the registered data in the access points. Also, the central node could have functionality for load balancing, keeping track of connected mobile devices, etc.

In addition to the information on which user that sends which packets that is contained in the labels, the access points could also provide information about source and destination of the data packets which labels are registered in the access point. Also, the label could comprise information about the content of the labeled data packet and the billing record could then be based on the type of content. Then, it becomes possible to differentiate billing on the contents. For example, browsing a web-site should be more expensive per data packet than watching a video or sending e-mail.

Also, according to the invention, a system for billing in a multi-operator network comprising a plurality of access points forming a private network, and at least one gateway having access to a remote service, comprising: means for tracing the route of a data packet based on information contained in said data packet registered along the route of said packet, said information comprising the identity of a mobile device originally sending said data packet; and means for creating a billing record separated on nodes involved in said traced route.

Hereby a system is provided overcoming the above-mentioned problems. The advantages of the system correspond to those of the method for billing according to the invention.

BRIEF DESCRIPTION OF THE DRAWINGS

For exemplifying purposes, the invention will be described to embodiments thereof illustrated in the attached drawings, wherein.

DESCRIPTION OF A PREFERRED EMBODIMENT

Figure 1:
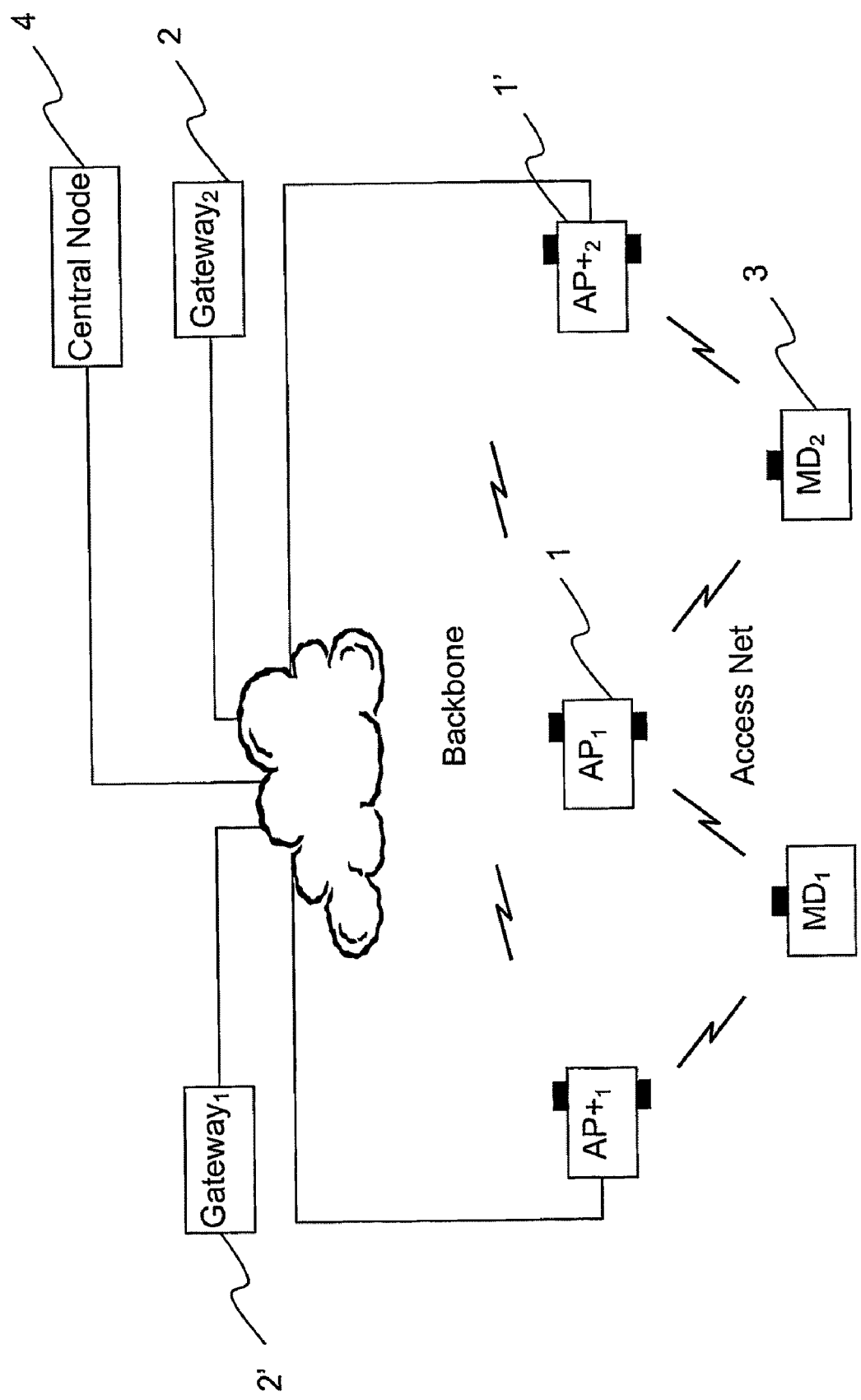
FIG. 1 illustrates a network according to an embodiment of the invention.

Referring to FIG. 1, the environment of the invention will now be described in order to give a clear understanding of the invention. The environment of the invention comprises a network comprising one or more access points 1 (AP), a gateway 2, mobile devices 3 (MD) and a central node 4. The communication between the components in the network is packet based and preferably uses the TCP/IP protocol, but other protocols are also within the scope of the invention, such as IPX, etc. The access points 1 form a private network, which fully or partly is wireless, hereafter called the "backbone". This backbone is connected to other networks through access points 1 having a possibility to connect to a gateway 2 which has access to a remote service 5 (shown in FIG. 2), such as the Internet or another private network, such as a corporate intranet. This connection is preferably some kind of wired connection, such as ISDN, T1, etc. Access points having a wired connection 1' to a gateway are indicated as AP+ in the figures. The gateway 2 has at least gateway functionality, but could in one embodiment also comprise functionality for Network Addressing Translation (NAT). In one aspect, the access point 1 could be treated as a foreign agent in a network using the mobile IP protocol and the gateway 2 could then be treated as a home agent. Much of the administration and registration of the components are managed by the central node 4. The mobile devices 3 connect to one of the access points 1 with any type of wireless connection, but preferably wireless LAN, for instance using the standard IEEE 802.11b. However, other potential technologies such as Hiperlan 2 or Bluetooth are also possible. The mobile device 3 can be any type of mobile device such a portable computer, a personal digital assistant (PDA), an IP telephone, although with "mobile" does not only mean lightweight devices that fit into the pocket, since the invention is also applicable to for instance a stationary personal computer having possibilities to connect wirelessly to the access point. This could be of interest when, for example, setting up a temporary work environment comprising a plurality of stationary computers somewhere at a university campus.

Figure 2:
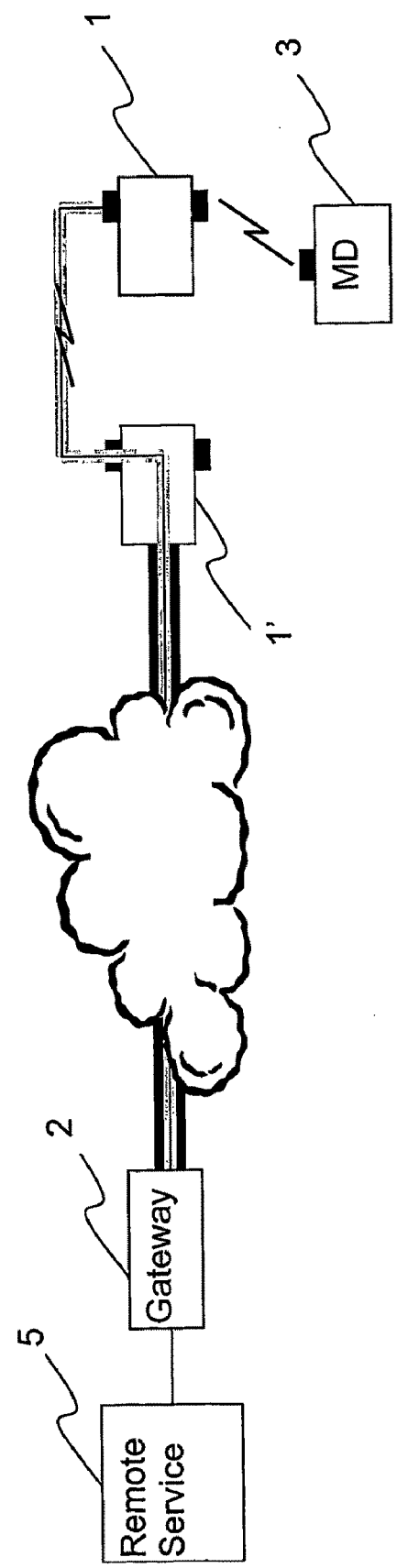
FIG. 2 illustrates a tunneled connection from a mobile device to a remote service.

Referring to FIG. 2, a communication path using the backbone will now be described. A mobile device 3 connect to the first access point 1 (AP) using wireless LAN. Then, this AP 1 establishes a path to the gateway 2. This path is preferably tunneled in order to come around addressing problems. Also, this tunnel could be encrypted and take advantage of advanced authorization protocols, such as certificates and digital signatures. Since the AP 1 does not have a direct wired connection to a gateway 2, the path is established via the backbone through another access point 1' having a wired connection to a gateway 2. Then, in order to overcome addressing problems the other access point 1' also uses a tunnel for transferring data to the gateway 2.

Figure 3:
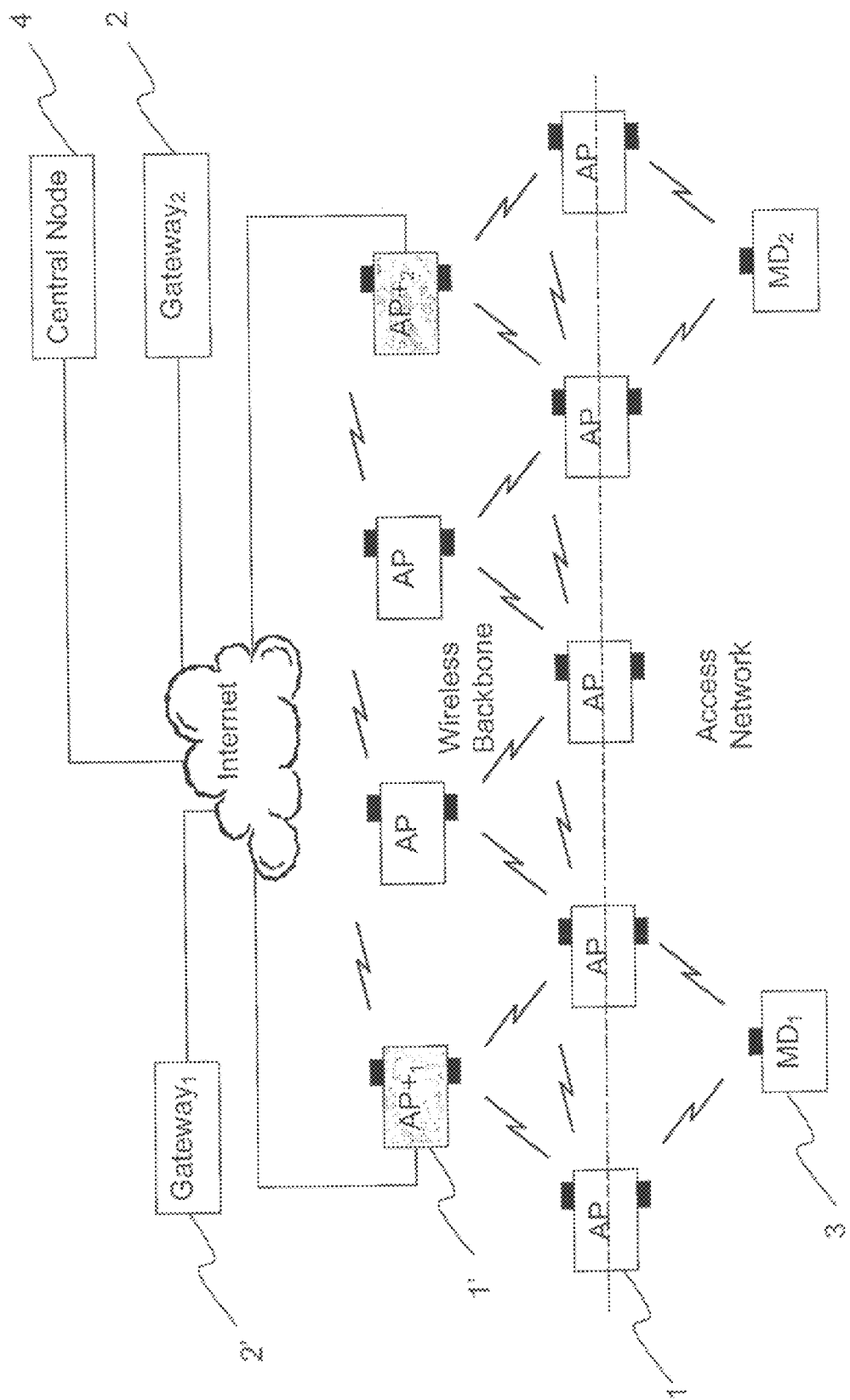
FIG. 3 illustrates a schematic view of a more complex network according to an embodiment of the invention.
Figure 4:
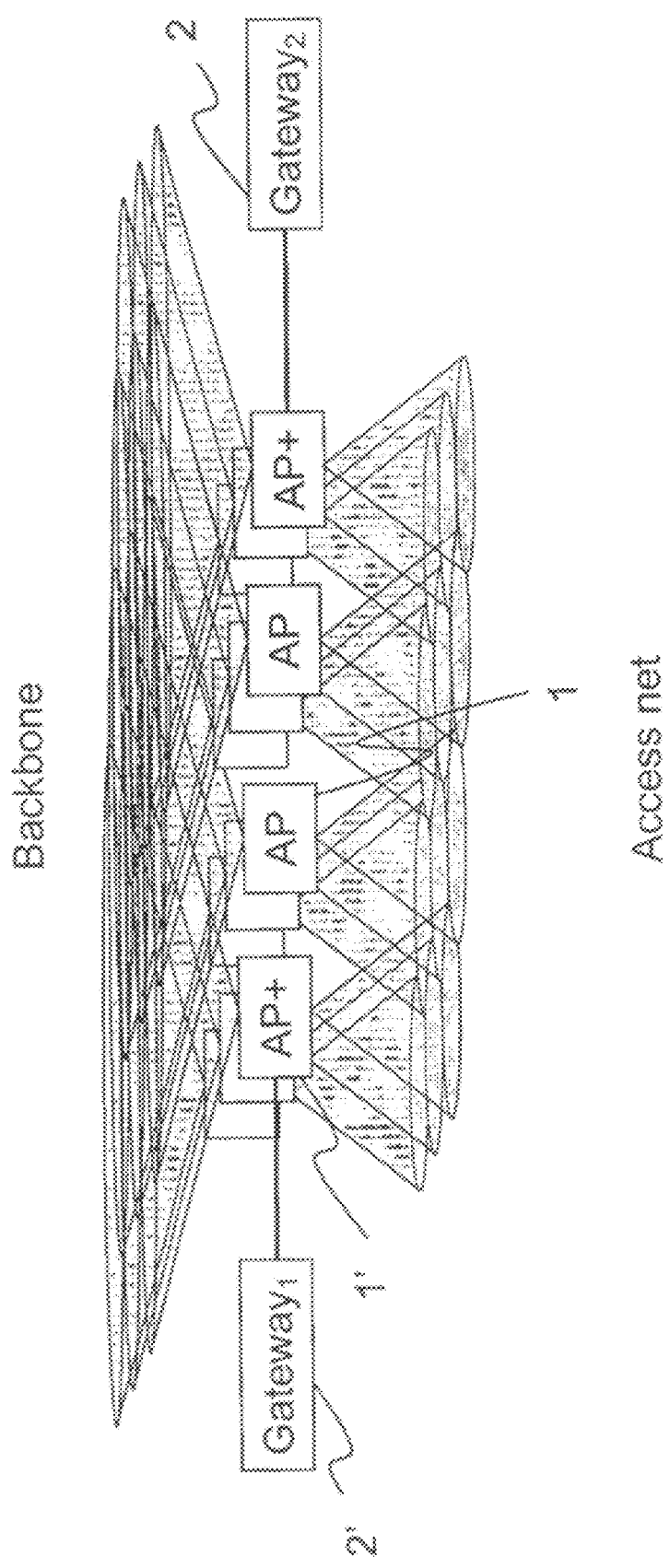
FIG. 4 illustrates the backbone and the access network.

In FIG. 3 a more complex network is illustrated. Through this illustration it is apparent that there are often a plurality of routing paths for the communication from a mobile device 3 to a gateway 2. The routing paths are primarily administered by the central node 4. Then, the access points 1 are provided with instructions of how to route packets from a given mobile device 3. The invention provides a convenient way of introducing multi-operator networks. Therefore, the access points 1 and 1' and the gateways 2 and 2' could belong to different operators, and the network in between is probably owned by different operators. Therefore, the routing paths, and which gateway that is used for connection to other networks, such as the Internet, should be dependent on the preferences of the user of the mobile device, the operator of the access point(s), the operator of the gateways, and the provider of the wired connections. In FIG. 4 the difference between the backbone and the communication between the mobile devices 3 and the access points 1 is illustrated. The communication between the mobile devices 3 and the access points 1 is separated from the backbone network. The network between mobile devices 3 and the access point 1 is referenced herein as the access network. Separating the traffic into two or more wireless networks means additional available bandwidth and improved flexibility. As an example the wireless backbone may use a completely different wireless technology and/or different antennas than those for the access network. However, as described above the backbone network uses wireless technology, which for example could be a wireless LAN or HiperLAN. But, in some occasions parts of the backbone network could be wired. For example, in a facility comprising of several floors whereof one is basement, it could be useful to use a wired connection from an access point, located in the basement not having a direct wired connection to a gateway, to another access point some floors up in the building which has a wireless connection to a gateway or a wireless connection to another access point located for example outdoors. Preferably, the range of the access net for a given access point is smaller than its range for communicating with other access points. Thus, such a backbone network is a truly ad-hoc network, where one access point could be added or removed without any configuration needed in other access points or in any central node in order to integrate and disintegrate, respectively, an access point.

Figure 5:
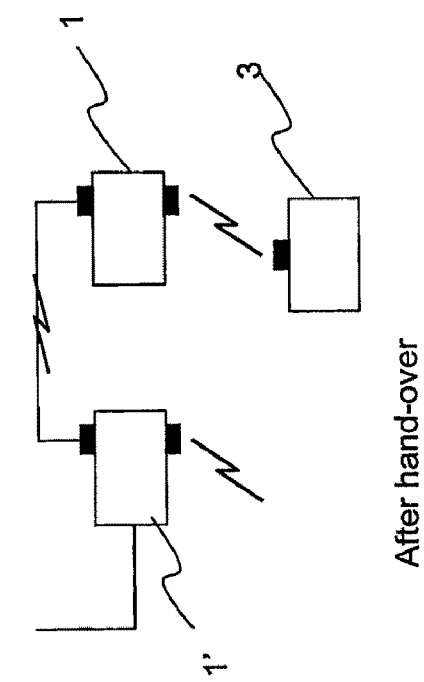
FIG. 5 illustrates a hand-over process.
Figure 5:
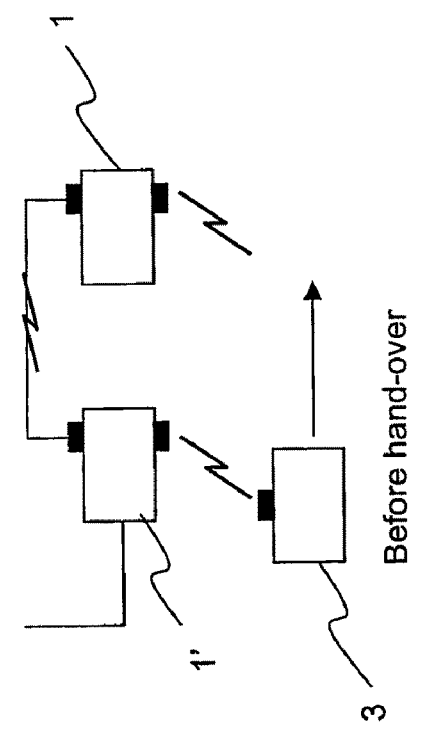

The mobile device 3, must at least have a communication device corresponding to that or those of the access points 1, i.e. in this embodiment a radio card with support for the IEEE 802.11b standard. Also, the mobile device 3 must have support for some kind of authentication when connecting to an access point 1. Since most mobile devices 3 in their nature are mobile, the access points 1 must have support for hand-over. The hand-over process could for example be based on measuring the signal strength. One type of hand-over is illustrated in FIG. 5. At time before hand-over, the mobile device receives advertisements from both the access point 1 and the access point 1'. Then, software, preferably implemented in the mobile device 3 determines the signal quality and strength from each access point 1, 1'. Before hand-over, the software determines that access point 1' offers the best connection, but even after registration, it evaluates the offers from the access point 1. Then, when the mobile device 3 moves closer to the access point 1, the result of the evaluation instructs the mobile device to communicate with the access point 1 instead. When the mobile device 3 connects to an access point 1, the central node 4 is informed in order to keep track of the mobile devices connected to the backbone.

Now, the access point 1 and a procedure for connecting to an access point 1 in such a network will be described. Preferably, the access point 1 has means for automatically configuring itself to operate in the network. Then, when someone wants to install such an access point 1, it will first connect to the central node 4, which is the unit that administrates the access points 1. Then, the access point is provided with an identifier, for example an IP number. In one embodiment, the connection comprises authentication means for accepting or denying of access points that want to connect. Then, the access point searches for any adjacent access point in order to contribute to the backbone network. Since users of mobile devices often use an access point for communicating to the Internet to browse a web site, the access point preferably has a caching function reducing the load on the backbone or the data traffic to and from the gateway.

The means for establishing a communication route to a gateway could take into account the existence of several gateways. Then, either the access point or the central node could provide the optimal route to a service on the public network. This could also be dependent on the users preferences. This is important when taking the billing of the connection into account, but also when considering performance issues.

When a user of a mobile device wants to connect to an access point, the identity of the user has first to be authenticated. All user identities which are allowed to use the access point are registered in the central node. One way of authentication is by sending a random number from the access point to both the mobile device and the central node simultaneously. Then should the mobile device as well as the central node be provided with a private key each in order to create a hash value of the random value and then submit this to the access point. Then, if they are equal the mobile device is accepted.

Since, the network comprises access points and gateways provided by different operators, it is one of the purposes of the invention to solve the billing and compensation to nodes involved in the path of a data packet. In one embodiment this is solved when the user is authenticated by means of using a central node. Then the user is assigned a network address which is used in the mobile device communication. Thus, since only a single user is assigned a specific network address at a time, this could be the identifier, which is traced along the data packets routes in the network. In another embodiment, this is solved by adding extra information to the data packets when forwarding them from the access point where the mobile device is connected. This extra information is called a label. For example, a label can comprise the information in table I below:

TABLE I

| | |
|---|---|
| Service ID | Information about what kind of information the data packet is handling, for example browsing, e-mail, voice over IP, commercials, control signal, etc |
| User ID | The identification of the user that sends/receives data packets |
| Remote site/ User ID | |
| Date | |
| Time | |
| Bytes | The amount of bytes that has been transferred |

Of course, the label can contain less or more information and is not limited to those elements described above. In another embodiment, the label is written in a tagged format. It is then up to the respective node in the route of the packet to collect information about the traffic.

It is this information in the label that serves as a base for the billing method and system according to the invention, which hereafter will be described in detail. Since a data packet from a mobile device can take several different routes and pass a variety of operators, it is important that this information is registered and analyzed. For example, if a café owner is interested in setting up an access point in his café in order to attract more customers, or at least those customers who are interested in connecting to a remote service, such as a website on the Internet, the café owner must get compensation for the data traffic. Since, in this example the café owner does have a wired connection to a gateway using for instance a telephone operator as a provider, the café owner will also have costs for utilizing that connection. However, except from possible increased revenues from coffee sales, the café owner is interested in obtaining compensation from guests using his access point. But, since his access point could, and also probably is, used by other access points owned by shop owners nearby, they will also use his connection to a gateway.

Another scenario exists when the café owner's wired connection is down. In that scenario, the cafe owner can utilize a connection of another access point to the same or another gateway, but now sending the data first through the backbone network. Now, we have a complex situation of costs, revenues and compensations. This is solved by the billing method and system according to the invention.

Then, according to one embodiment of the invention each access point has means for registering the labels of data packets which are sent through it, both those which are sent directly to the access point from the access network and those which are sent within the backbone network. Preferably, information is collected at which access point the label was registered, which is important when distributing the costs among the operators involved in a route of a data packet. This information is collected and preferably stored. In the system there is a central node, which is adapted to receive this information from the access points in order to redistribute the costs. There are several different models of cost distribution.

The access point can then either send the registered labels according to predetermined rules or on request from the central node. Such predetermined rules could comprise a rule that initiates transfer of the oldest saved data when data traffic is below a predefined level.

As described above, the costs can be based on data content, time of connection, amount of data communicated, etc, all depending on information contained in the label and data collected/registered at the access point. The billing could be on different levels, in one embodiment the invoices could be sent directly to the end user, and then the costs are distributed among the involved parties. Another way of billing, is letting the end user pay for the service to which the user is connecting through the gateway. Then, the invoice for utilizing the access point(s), gateway and the communication in between is sent to the service provider.

The central node could also, except for administering cash flow and billing be responsible for determining optimal routes. The optimal routes could be dependent on the capacity of individual connections within the backbone network, availability and performance of wired connections to gateways, etc.

The invention has been described above in terms of a preferred embodiment. However, the scope of this invention should not be limited by this embodiment, and alternative embodiments of the invention are feasible, as should be appreciated by a person skilled in the art. For example, the backbone network and the access network as described could be integrated in the same network utilizing the same communication means. Also, billing could be based on whether a packet is successfully delivered or not. Such embodiments should be considered to be within the scope of the invention, as it is defined by the appended claims.

The invention claimed is:

1. A method for billing in a multi-operator network including a plurality of access points forming a private network, and at least one gateway having access to a remote service, the method comprising:

adding a label to a data packet transferred from a mobile device directly to an access point, said label including the identity of said mobile device;

tracing a route of the data packet based on information contained in said data packet registered along the route of said data packet, said information including an identity of the mobile device originally sending said data packet;

registering labels of all data packets transferred through said access point either directly or indirectly through another access point from the mobile device; and sending from each access point information to a central node regarding said labels.

2. A method according to claim 1, wherein said information is stored in a header of said data packet and said identity is a network address of said mobile device.

3. A method according to claim 1, further comprising:
authenticating the identity of a mobile device connecting to an access point.

4. A method according to claim 1, wherein said creating the billing record is executed in a central node in said network.

5. A method according to claim 1, wherein said label is additional data which is added to the data packet in said access point.

6. A method according to claim 1, wherein said label is additional data which is added to the data packet in said mobile device.

7. A method according to claim 1, wherein said sending from each access point information is initiated by said central node.

8. A method according to claim 3, wherein said information includes information about source and destination.

9. A method according to claim 3, wherein said label includes information about a content of the labeled data packet and said billing record is based on a type of content.

10. A system for billing in a multi-operator network including a plurality of access points forming a private network, and at least one gateway having access to a remote service, comprising:

a device for adding a label to a data packet transferred from a mobile device directly to an access point, said label including the identity of said mobile device;

a device for tracing a route of the data packet based on information contained in said data packet registered along the route of said data packet, said information including an identity of the mobile device originally sending said data packet;

a device for registering labels of all data packets transferred through said access point either directly or indirectly through another access point from the mobile device; and a device for sending from each access point information to a central node regarding said labels.

11. A system for billing in a multi-operator network including a plurality of access points forming a private network, and at least one gateway having access to a remote service, comprising:

a device for adding a label to a data packet transferred directly from a mobile device, said label including an identity of said mobile device;

a device for tracing a route of said data packet based on labels registered along the route of said data packet;

a device for registering labels of all data packets transferred through said access point either directly or indirectly through another access point from the mobile device; and a device for sending from each access point information to a central node regarding said labels.

12. A method according to claim 1, further comprising creating a billing record separated on nodes involved in said traced route.

13. A system according to claim 10, further comprising a device for creating a billing record separated on nodes involved in said traced route.

14. A system according to claim 11, further comprising a device for creating a billing record separated on nodes involved in said traced route.

* * * * *